Patented Nov. 1, 1949

2,486,792

UNITED STATES PATENT OFFICE 2,486,792

1 - ALKYL - 4 - (META-HYDROXYPHENYL)-4-CARBALKOXY-PIPERIDINES AND THEIR PRODUCTION

Karl Miescher, Riehen, and Hans Kaegi, Basel, Switzerland, assignors to Ciba Pharmaceutical Products, Incorporated, Summit, N. J., a corporation of New Jersey No Drawing. Application April 12, 1944, Serial No. 530,742. In Switzerland June 25, 1943

8 Claims. (Cl. 260—294)

1

The object of the present invention is a process of preparing 4-aryl-piperidine-4-carboxylic acid nitriles, and the corresponding esters and amides.

These 4-aryl-piperidines are obtained by causing α-arylated tertiary γ-amino-butyric acid nitriles to react with reactive esters of alkylene-1:2-diols in the presence of acid binding agents in one or more steps, if desired, converting the nitrile group in the 4-aryl-piperidine-4-carboxylic acid nitriles thus obtained into an ester, an amide or a keto group, and, if desired, splitting off radicals which are suitable for being eliminated and are attached to the cyclic nitrogen at any phase of the reaction.

As starting products there are used therefore α-arylated tertiary γ-amino-butyric acid nitriles in which the aryl group may be represented, e. g. by a substituted or unsubstituted phenyl or naphthyl group the substituents being in any position. The aliphatic radical can be straight or branched or even arranged as part of a ring. For example the following compounds can be used: α - phenyl - γ - (methyl - benzyl - amino) - butyric acid nitrile, α-phenyl-γ-(dimethyl- or diethyl-amino)-butyric acid nitrile, α-(benzylhydroxy- or acylhydroxy-phenyl)-γ-(methylbenzyl - amino) - butyric acid nitriles, α - (o - anisyl)-γ-(methyl-diphenyl - methyl - amino) - butyric acid nitrile, α-phenyl-γ-(methyl-benzylamino)-valeric acid nitrile, α-naphthyl-γ-(dimethyl-amino)-butyric acid nitrile, or α-phenyl-α-[o - (methyl - benzyl - amino) - cyclo - hexyl]-acetic acid nitrile. The above mentioned starting products are in some instances known or can be obtained in the usual manner.

For the reaction with the above nitriles the following substances, for example, come into consideration: ethylene-dibromide, ethylene-chlorobromide, ethylene - diiodide, propylene - 1:2 - dibromide, propylene - 1:2 - chloro - bromide, butylene-1:2- or 2:3 - dibromide, β - chloro - ethanol-p-toluene-sulfonic acid ester, glycol-di-

2 para-toluene sulfonic acid ester or propane-1:2-diol-di-methane sulfonic acid-ester.

The reaction itself is carried out in the presence of acid binding agents. For this purpose the following can be used: sodium, potassium, lithium, calcium, or their alcoholates, amides, hydrides or hydrocarbons, as e. g., potassium - tertiary butylate, potassium - tertiary amylate, sodium amide, sodium hydride, butyl-lithium, phenyl-sodium or phenyl-lithium. It is advantageous to use inert solvents such as, e. g. ether, benzene, toluene, xylene or hexene and to work in the presence of indifferent gases such as nitrogen. According to the reactivity of the components, the reaction is carried out by cooling, at ordinary temperature or even by heating. It is possible to form the ring in one or more steps.

The nitrile group of the compounds thus obtained may be converted in known manner into an ester group or even into a keto group. The nitrile group can also be converted into and amide group in known manner directly or after formation of the carboxyl group. The piperidines obtained contain a quaternary ring nitrogen atom. They can be converted in piperidines with tertiary nitrogen, for example, by splitting off alkyl halide by heating. The conversion is also effected easily if there is as a radical attached to the nitrogen, e. g. a mono-, di- or triaryl methyl group which can be removed by, among others, the help of catalytic active hydrogen or by treatment with e. g. acids or by heating. This conversion can moreover be carried out at any desirable phase of the reaction. If the aryl radical of the reaction products contains one or several substituted hydroxyl groups, these can be converted into unsubstituted hydroxyl groups in the usual manner, for example by treatment with glacial acetic hydrohalic acids.

The process is further elucidated by formulae on the basis of the following scheme:

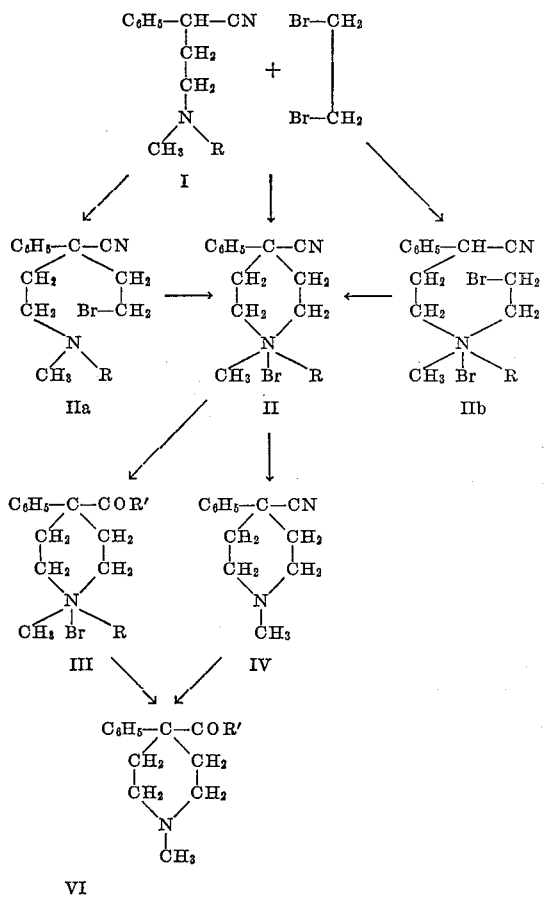

R = hydrogen or hydrocarbon radical capable of being split off
R' = alcohol radical or substituted or unsubstituted amino group According to the present process a large number of piperidine compounds can be obtained. As a result of the considerable possibilities of variation, numerous new compounds are accessible in addition to known compounds. Of particular interest is the discovery that, for example, the reaction of ethylene-dibromide with a compound of the Formula I according to the above scheme leads pre-eminently to cyclic compounds and not to acyclic ones. It also seems surprising, for example, that the conversion of a compound of the Formula II, in which R represents a hydrocarbon radical capable of being split off, e. g. benzyl, into the compound of the Formula IV by catalytic hydrogenation occurs without attacking the nitrile group.

Reference is made to our related copending applications Serial No. 534,800, filed May 9, 1944, now Patent 2,486,793 and Serial No. 592,535, filed May 7, 1945, now Patent 2,486,794.

The following examples illustrate the invention, the parts being by weight:

*Example 1*

52.8 parts of α-phenyl-γ-(methyl-benzyl-amino)-butyric acid nitrile (B. P. $_{0.1\,mm}$ 153–155° C., prepared from benzyl cyanide and β-chloroethyl-methyl-benzyl-amine in the presence of sodium amide) in 200 parts of ether are added drop by drop while stirring to 10 parts of powdered sodium amide which is suspended under nitrogen in 200 parts of ether. When the reaction is complete, the mixture is stirred for an hour, then 300 parts of ether are added, the whole is cooled with ice and 40 parts of ethylenedibromide are added. Stirring is then carried out again for an hour with ice cooling, for another hour at room temperature and for 4–5 hours while heating to 40° C. A thick suspension of salts is formed. This is decomposed with water and aqueous hydrobromic acid is added until an acid reaction occurs. The 1:1-methyl-benzyl-4:4-phenyl-cyano-piperidinium bromide formed, which is difficultly soluble in water, is precipitated and is isolated by suction filtering and washing with ether and water. It still contains some hydrobromide of the starting product as well as other by-products. For purification the crude bromide is dissolved in the just necessary quantity of boiling water, soda solution is added and the mixture is allowed to cool. The thick mass is thoroughly shaken with ether which absorbs the non quaternary bases. After suction filtering and washing with water and ether the remaining salt is recrystallized from the fourfold quantity of boiling water. Thus a good yield of the pure 1:1-methyl-benzyl-4:4-phenyl-cyano-piperidinium-bromide is obtained in two crystalline forms, as glossy flakes and as white aggregates, which cannot be converted into each other and probably represent cis-trans-isomers. The melting point of both bromides is not sharp and lies at about 245 to 260° C.

If the bromide is shaken up in aqueous alcoholic solution with hydrogen and palladium black, 1-methyl-4:4-phenyl-cyano-piperidine is formed almost quantitatively from both crystalline forms by splitting off of toluene. The 1-methyl-4:4-phenyl-cyano-piperidine can be saponified and esterified with ethanol in known manner to produce 1-methyl-4:4-phenyl-carbethoxy-piperidine.

The same substance is obtained, if the quaternary bromide is heated with sulfuric acid of about 70–80 per cent. strength, the resulting acid esterified with ethanol and the product subsequently hydrogenated.

*Example 2*

A solution of 52.8 parts of α-phenyl-γ-(methyl-benzyl-amino)-butyric acid nitrile in 200 parts of ether is added drop by drop to 10 parts of powdered sodium amide in 200 parts of ether. After stirring for 1 hour, a solution of 50 parts of propylene-1:2-dibromide in 100 parts of ether is added. The ether slowly reaches its boiling point which is maintained for 2 hours by external heat. In this reaction only sodium bromide is precipitated and no quaternary salt. On decomposition with water an ethereal and an aqueous layer are obtained which are easily separated. After evaporation of the ether an oil remains which after prolonged heating on the water bath becomes solid and insoluble in ether. Therefore the formation of the ring of the quaternary bromide occurs only after applying considerable heat. The product is triturated with ether, filtered with suction and thus the 1:1-methyl-benzyl-2-methyl-4:4-phenyl-cyano-piperidinium bromide is obtained. The product is dissolved without further purification in the tenfold quantity of alcohol of 50 per cent strength and after the addition of about 2 per cent of a platinum catalyst shaken up with hydrogen. When no more hydrogen is absorbed, the whole is filtered with suction, a greater part of the liquid is evaporated and the residue is rendered alkaline and extracted with ether. On evaporation the ether leaves behind an oil.

which boils under a pressure of 0.07 mm. at 107–110° C. This is the 1:2-dimethyl-4:4-phenyl-cyano-piperidine. It can be saponified and esterified according to known methods whereby with the use of ethyl alcohol 1:2-dimethyl-4:4-phenyl-carbethoxy-piperidine is obtained which forms an oil boiling at 105–109° C. under a pressure of 0.15 mm.

As starting product α-(m-nitro-phenyl)-γ-(methyl-benzyl-amino)-butyric acid nitrile, e. g. can also be used and the nitro group in the resulting compounds converted in usual manner into an amino- or a hydroxy group.

The 1:2-dimethyl-4:4-phenyl-cyano-piperidine obtained can further be converted in known manner into the 1:2-dimethyl-4-phenyl-piperidine-4-carboxylic acid amide by partial saponification. For the manufacture of amides the obtained nitrile can also be completely saponified, the acid thus obtained can be converted into the acid chloride by treatment for example with thionyl chloride, and the acid chloride reacted with ammonia or amines. Thus, from the corresponding acid chloride and diethylamine there is obtained 1:2-dimethyl-4-phenyl-piperidine-4-carboxylic acid diethylamide.

These amides can also be obtained by converting the above obtained 1:1-methyl-benzyl-2-methyl-4:4-phenyl-cyano-piperidinium bromide into the amides and subsequently splitting off the benzyl group.

In an analogous manner the following compounds may be produced: 1:3-dialkyl-4:4-phenyl-carbalkoxy-piperidines, such as 1:3-dimethyl-4-phenyl-carbethoxy-piperidine, 1:2:3-trialkyl-4:4-phenyl-carbalkoxy-piperidines, such as 1:2:3-trimethyl-4:4-phenyl-carbethoxy-piperidine or 1-alkyl-4:4-phenyl-carbalkoxy-decahydro-quinolines, such as 1-methyl-4:4-phenyl-carbethoxy-decahydro-quinoline.

*Example 3*

A solution of 65 parts of α-phenyl-γ-(diethylamino)-butyric acid nitrile in 200 parts of absolute ether is added drop by drop to 14 parts of powdered sodium amide in 300 parts of ether. After an hour's stirring 300 parts of ether are added, the mixture cooled with ice and then 60 parts of ethylene-dibromide added. Stirring is carried out for one hour at ice temperature, for another hour at room temperature and four to six hours at the boiling temperature of the ether. The very consistent reaction mass is separated by filtration with suction, washed with ether and dried. 125 parts of a white salt mixture are obtained which consists, besides sodium bromide, chiefly of 1:1-diethyl-4:4-phenyl-cyano-piperidinium bromide. The latter is readily soluble in water. By treating with alcohol, the insoluble sodium bromide contained therein can be eliminated. If the piperidinium bromide or the hydroxide which can be prepared from it, is heated in the vacuum, there is produced by cleavage of ethyl bromide or ethyl alcohol, respectively, the 1-ethyl-4:4-phenyl-cyano-piperidine which is an oil boiling at 110–112° C. under a pressure of 0.05 mm. It can be saponified and esterified in known manner.

*Example 4*

18.8 parts of α-phenyl-γ-(dimethylamino)-butyric acid-nitrile (oil of boiling point 158–160° C. under 17 mm. pressure, obtained from benzyl-cyanide, β-dimethylaminoethyl chloride and sodium amide) are dissolved in 100 parts by volume of ether and allowed to flow into 5 parts of pulverized sodium amide in 80 parts by volume of ether. When the reaction is complete, the whole is cooled to −5° C., 18.8 parts of ethylene-dibromide in 50 parts by volume of ether are added, and the further procedure is as indicated in Example 3. The 1:1-dimethyl-4:4-phenyl-cyano-piperidinium bromide can be isolated from the suction-filtered crystal magma in laminae of melting point 305–315° C. (with decomposition). In the thermal decomposition of this substance or also of the crude product the 1-methyl-4:4-phenylcyano-piperidine described in Example 1 is obtained in good yield.

*Example 5*

6 parts of pulverized sodium in 80 parts by volume of toluene are converted into the phenyl sodium compound with 13.2 parts of chlorobenzene. 22 parts of α-(meta-methoxyphenyl)-γ-(dimethylamino)-butyric acid nitrile (yellowish oil of boiling point 184–186° C. under 14 mm. pressure, prepared from meta-methoxybenzyl-cyanide, β-dimethylaminoethylchloride and sodium amide) in 30 parts by volume of toluene are added drop by drop. After stirring for 3 hours a yellow green precipitate has separated. 18.8 parts of ethylene-dibromide in 100 parts by volume of toluene are added in drops at +10° C. to maximally 40° C. and the whole is further stirred for 15 hours. By filtering off and washing with ether there are obtained 45 parts of a nearly white powder. This yields on distillation (12 mm. 270–350° C. bath temperature) the 1-methyl-4:4-(meta-methoxyphenyl)-cyano-piperidine as a yellowish oil of boiling point 196–197° C. under 12 mm. pressure, methylbromide being split off from the quaternary compound.

On heating this nitrile with methanolic caustic soda solution to 190–200° C., there is obtained the 1-methyl-4-(meta-methoxyphenyl)-piperidine-4-carboxylic acid of melting point 272–274° C. (with decomposition) which yields the 1-methyl-4-(meta-methoxyphenyl)-piperidine-4-carboxylic acid ethylester on esterification with alcohol (oil of boiling point 195°–197° C. under 12 mm. pressure). The hydrochloride of this ester melts at 175–176° C.

When heating the above 1-methyl-4-(meta-methoxyphenyl)-piperidine-4-carboxylic acid with glacial acetic hydrogen bromide, there is formed the 1-methyl-4-(meta-hydroxyphenyl)-piperidine-4-carboxylic acid (brownish needles of melting point 280–285° C.). On esterification the 1-methyl-4-(meta-hydroxyphenyl)-piperidine-4-carboxylic acid ethylester is obtained therefrom which yields a hydrochloride of melting point 166–167° C.

When saponifying the 1-methyl-4:4-(meta-methoxyphenyl)-cyano-piperidine under mild conditions (2 hours at 160–170° C.), there is obtained the 1-methyl-4-(meta-methoxyphenyl)-piperidine-4-carboxylic acid amide in the form of crystals which melt at 133–135° C. with decomposition.

*Example 6*

When replacing in Example 1 the 52.8 parts of α-phenyl-γ-(methyl-benzyl-amino)-butyric acid-nitrile by 58.8 parts of α-(ortho-methoxyphenyl)-γ-(methyl-benzylamino)-butyric acid-nitrile (a thick oil of boiling point 165–166° C. under 0.06 mm. pressure, prepared from ortho-methoxy-benzylcyanide with β-chloroethyl-methyl-benzylamine in the presence of sodium amide), there is obtained the 1:1 - methyl - benzyl - 4:4 - (ortho-methoxyphenyl)-cyano-piperidinium bromide in white crystals of melting point 203–204° C.

If this bromide is shaken in an aqueous alcoholic suspension with hydrogen and palladium, it takes up 1 mol of hydrogen and goes into solution. When filtering the solution to remove the palladium and concentrating, the hydrobromide of the 1-methyl-4:4-(ortho-methoxyphenyl)-cyano-piperidine is crystallized in large brilliant crystals of melting point 262–264° C. The free base forms in ether rather sparingly soluble laminae of melting point 98–99° C.

*Example 7*

The 2:3-dimethoxybenzyl alcohol obtained by catalytic reduction of the 2:3-dimethoxy-benzaldehyde is converted into the 2:3-dimethoxy-benzylbromide (boiling point 140–142° C. under 11 mm. pressure) by allowing it to stand with aqueous hydrogen bromide and concentrated sulfuric acid, and this is again converted into the 2:3-dimethoxy-benzylcyanide (oil, boiling point 162–164° C. under 12 mm. pressure) by reaction with potassium cyanide. Phenyl-sodium is then prepared from 20 parts of sodium powder in 200 parts by volume of benzene with 48 parts of chlorobenzene. To this are added 70.8 parts of 2:3-dimethoxy-benzylcyanide and after some time 73.6 parts of β-chloroethyl-methyl-benzylamine. The reaction is completed by boiling the mixture for 1 hour in a reflux apparatus. The α-(2:3-dimethoxy-phenyl)-γ-(methyl-benzyl-amino) - butyric acid nitrile can be isolated from the reaction product as a thick oil of boiling point 180–181° C. under 0.1 mm. pressure.

If this nitrile is caused to react according to Example 5 in the presence of phenyl sodium with ethylene-dibromide, there is obtained 1:1-methyl-benzyl-4:4-(2':3'-dimethoxyphenyl) - cyano - piperidinium bromide of melting point 232–233.5° C., from which 1-methyl-4:4-(2':3'-dimethoxyphenyl)-cyano-piperidine - hydrobromide or the free 1 - methyl-4:4-(2':3'-dimethoxyphenyl)-cyano-piperidine of melting point 94–96° C. can be produced by catalytic hydrogenation.

What we claim is:

1. In a process for the manufacture of a 4-aryl-piperidine, the step of reacting an α-arylated tertiary γ-amino-butyric acid nitrile of the formula

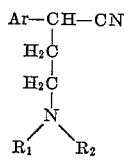

wherein Ar is an aryl radical, $R_1$ is lower alkyl and $R_2$ is a member selected from the group consisting of lower alkyl and aralkyl, with an alkylene-1:2-dihalide of the formula

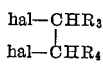

wherein hal is a halogen atom, $R_3$ and $R_4$ are members selected from the group consisting of hydrogen atoms and lower alkyl, in the presence of a dehydrohalogenating agent, whereby a 4:4-aryl-cyano-piperidinium-halide is formed of the formula

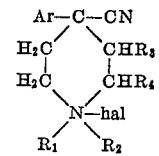

wherein Ar, $R_1$—$R_4$ and hal have the same meaning as above.

2. In a process for the manufacture of a 4-phenyl-piperidine, the step of reacting a tertiary γ-amino-α-phenyl-butyric acid nitrile of the formula

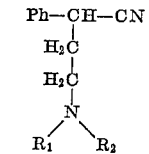

wherein Ph is a phenyl radical containing an alkoxy group in at least one of the positions ortho and meta, $R_1$ is lower alkyl and $R_2$ is a member selected from the group consisting of lower alkyl and aralkyl, with an alkylene-1:2-dihalide of the formula

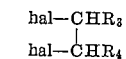

wherein hal is a halogen atom, $R_3$ and $R_4$ are members selected from the group consisting of hydrogen and lower alkyl, in the presence of a dehydrohalogenating agent, whereby a 4:4-phenyl-cyano-piperidinium halide of the formula

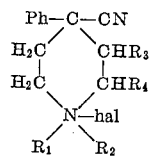

wherein Ph, $R_1$, $R_2$, $R_3$, $R_4$ and hal have the same meaning as above, is formed.

3. In a process for the manufacture of a 4-phenyl-piperidine, the steps of reacting α-(meta-methoxy-phenyl)-γ - (dimethylamino) - butyric acid nitrile of the formula

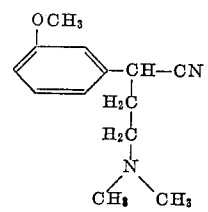

with ethylene-1:2-dibromide in the presence of phenyl - sodium, whereby 1:1 - dimethyl - 4:4-(meta-methoxy-phenyl) - cyano - piperidinium bromide of the formula

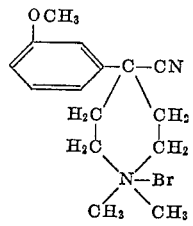

is formed, and then heating to split off methyl bromide attached to the quaternary nitrogen atom.

4. In a process for the manufacture of a 4-phenyl-piperidine, the steps of reacting α-(orthomethoxy-phenyl)-γ-(methyl - benzyl - amino)-butyric acid nitrile of the formula

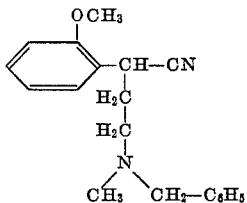

with ethylene-1:2-dibromide in the presence of sodium amide, whereby 1:1-methyl-benzyl-4:4-(ortho-methoxy-phenyl) - cyano - piperidinium bromide of the formula

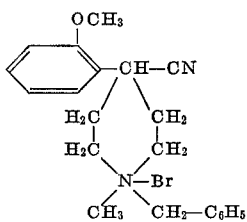

is formed, and then treating the resultant product with catalytically active hydrogen to split off the benzyl group and the bromine atom attached to the quaternary nitrogen atom.

5. In a process for the manufacture of a 4-phenyl-piperidine, the steps of reacting α-(2:3-dimethoxy-phenyl)-γ-(methyl-benzyl - amino)-butyric acid nitrile of the formula

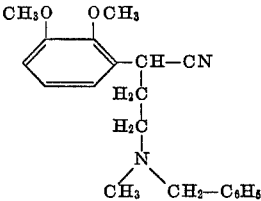

with ethylene-1:2-dibromide in the presence of phenyl-sodium, whereby 1:1-methyl-benzyl-4:4-(2':3'-dimethoxy-phenyl)-cyano - piperidinium bromide of the formula

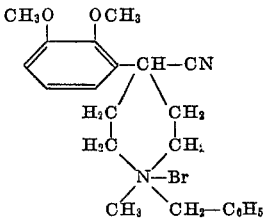

is formed, and then treating the resultant product with catalytically active hydrogen to split off the benzyl group and the bromine atom attached to the quaternary nitrogen atom.

6. A process for the manufacture of a 4-phenyl-piperidine, which comprises the steps of reacting α-(meta-methoxy-phenyl)-γ - (dimethylamino)-butyric acid nitrile of the formula

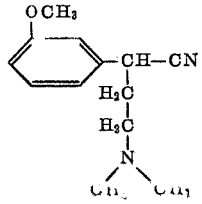

with ethylene-1:2-dibromide in the presence of phenyl - sodium, whereby 1:1 - dimethyl - 4:4 - (meta-methoxy - phenyl) - cyano - piperidinium bromide of the formula

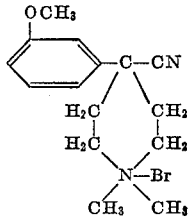

is formed and then heating to split off methyl bromide attached to the quaternary nitrogen atom, hydrolyzing the resultant product whereby the nitrile group is converted into the carboxy group and the methoxy group into the hydroxyl group, and then esterifying the resultant product with ethanol.

7. 1-alkyl-4:4-(meta - hydroxyphenyl) - carbalkoxy-piperidines of the formula

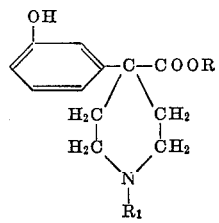

wherein R and R₁ are alkyl groups.

8. The 1-methyl-4 - (meta - hydroxyphenyl) - piperidine-4-carboxylic acid ethyl ester of the formula

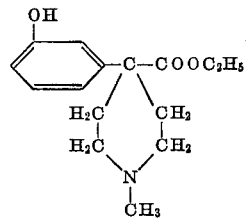

KARL MIESCHER.
HANS KAEGI.

REFERENCES CITED

The following references are of record in the file of this patent:

UNITED STATES PATENTS

| Number | Name | Date |
|---|---|---|
| 2,167,351 | Eisleb | July 25, 1939 |

FOREIGN PATENTS

| Number | Country | Date |
|---|---|---|
| 501,135 | Great Britain | 1939 |

OTHER REFERENCES

Bergel: Journal Chemical Society, June 1944, pages 261-269.

Journ. Amer. Chem. Soc., vol. 65 pages 2093-2095.

Archiv. for Exp. Path Pharm., vol. 196, pages 127-129.

Certificate of Correction

November 1, 1949

Patent No. 2,486,792

KARL MIESCHER ET AL.

It is hereby certified that errors appear in the printed specificaton of the above numbered patent requiring correction as follows:

Column 1, lines 10 and 11, for the words "ester, an amide or a keto group" read *ester or an amide group*; line 29, for "methyl-benzyl-" read *ethyl-benzyl-*; column 3, line 40, strike out "hydrogen or"; column 9, lines 63 to 71 inclusive, strike out the formula and insert instead the following—

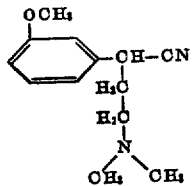

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*